(12) United States Patent
Yan et al.

(10) Patent No.: US 10,602,534 B2
(45) Date of Patent: Mar. 24, 2020

(54) UPLINK INFORMATION SENDING METHOD AND APPARATUS

(71) Applicant: HUAWEI TECHNOLOGIES CO., LTD., Shenzhen, Guangdong (CN)

(72) Inventors: Zhiyu Yan, Shenzhen (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/198,770

(22) Filed: Nov. 22, 2018

(65) Prior Publication Data

US 2019/0090262 A1    Mar. 21, 2019

Related U.S. Application Data

(63) Continuation of application No. PCT/CN2018/089812, filed on Jun. 4, 2018.

(30) Foreign Application Priority Data

Jun. 6, 2017    (CN) .......................... 2017 1 0419346

(51) Int. Cl.
*H04W 72/12*    (2009.01)
*H04W 72/04*    (2009.01)
(Continued)

(52) U.S. Cl.
CPC ... *H04W 72/1268* (2013.01); *H04W 56/0045* (2013.01); *H04W 72/042* (2013.01); *H04B 7/2656* (2013.01); *H04W 28/24* (2013.01)

(58) Field of Classification Search
CPC combination set(s) only.
See application file for complete search history.

(56) References Cited

U.S. PATENT DOCUMENTS

2011/0051633 A1    3/2011  Pan et al.
2012/0094664 A1*   4/2012  Jung ..................... H04W 48/16
                                                         455/434

(Continued)

FOREIGN PATENT DOCUMENTS

CN    101572577 A    11/2009
CN    102083197 A     6/2011
(Continued)

OTHER PUBLICATIONS

International Search Report PCT/CN2018/089812, dated Sep. 3, 2018.*

(Continued)

*Primary Examiner* — Maharishi V Khirodhar
*Assistant Examiner* — Kenneth P Hunt
(74) *Attorney, Agent, or Firm* — Leydig, Voit & Mayer, Ltd.

(57) ABSTRACT

This application provides a method for sending uplink information in a wireless communication system that supports various services such as ultra-reliable and low latency communications (URLLC). A terminal device receives a timing advance coefficient from a network device. The terminal device determines value of a first timing advance based on a first time length and the timing advance coefficient. The first time length is one of at least two different time lengths that are supported by the terminal device. The terminal device sends the uplink information to the network device based on the first timing advance. With this method, the terminal device can uses different timing advances in different scenarios, so that diversified requirements of the fifth generation (5G) mobile communication systems for uplink synchronization are satisfied.

6 Claims, 6 Drawing Sheets

(51) Int. Cl.
*H04W 56/00* (2009.01)
*H04W 28/24* (2009.01)
*H04B 7/26* (2006.01)

(56) References Cited

U.S. PATENT DOCUMENTS

| | | | | |
|---|---|---|---|---|
| 2013/0215874 | A1* | 8/2013 | Yang | H04W 56/00 370/336 |
| 2016/0044666 | A1* | 2/2016 | Shin | H04W 72/1278 370/336 |
| 2016/0338021 | A1 | 11/2016 | Chae et al. | |
| 2016/0345348 | A1* | 11/2016 | Chae | H04W 76/14 |
| 2017/0094655 | A1* | 3/2017 | Dai | H04L 5/14 |
| 2017/0111908 | A1* | 4/2017 | Xiong | H04W 74/08 |
| 2017/0180001 | A1* | 6/2017 | Wang | H04B 1/7143 |
| 2017/0280471 | A1* | 9/2017 | Lee | H04W 72/12 |
| 2018/0176947 | A1* | 6/2018 | Yu | H04W 74/08 |
| 2018/0352527 | A1* | 12/2018 | Wang | H04L 5/0053 |
| 2019/0141697 | A1* | 5/2019 | Islam | H04L 5/0094 |
| 2019/0150108 | A1* | 5/2019 | Byun | H04W 76/30 370/329 |

FOREIGN PATENT DOCUMENTS

| | | | |
|---|---|---|---|
| CN | 104270810 A | | 1/2015 |
| CN | 102647783 B | * | 2/2015 |
| CN | 105940735 A | | 9/2016 |
| CN | 106034354 A | | 10/2016 |
| EP | 2106157 A1 | | 9/2009 |
| EP | 2916603 A1 | | 9/2015 |
| WO | 2013120258 A1 | | 8/2013 |
| WO | WO-2016049860 A1 | * | 4/2016 ............ H04W 56/00 |

OTHER PUBLICATIONS

English Translation CN 102647783 B, Aug. 22, 2012.*
Nokia Siemens Networks, Nokia, "R1-072278 Uplink Timing Control," May 7-11, 2007, Table 1 "TA Granularity".*
CATT, "R4-092859 Discussion on Timing Advance Measurement for Positioning," Aug 24-28, 2009, 2.1.3 Proposal 2 and Proposal 3.*
3GPP TS 38.211 V0.0.0 (May 2017),3rd Generation Partnership Project;Technical Specification Group Radio Access Network;NR;Physical channels and modulation(Release 15),total 10 pages.
Ericsson,"Timing advance for TDD NR",3GPP TSG-RAN WG4 Meeting #80bis R4-167639,Ljubljana, Slovenia, Oct. 10-14, 2016,total 4 pages.

* cited by examiner

Network device 110       Terminal device 120

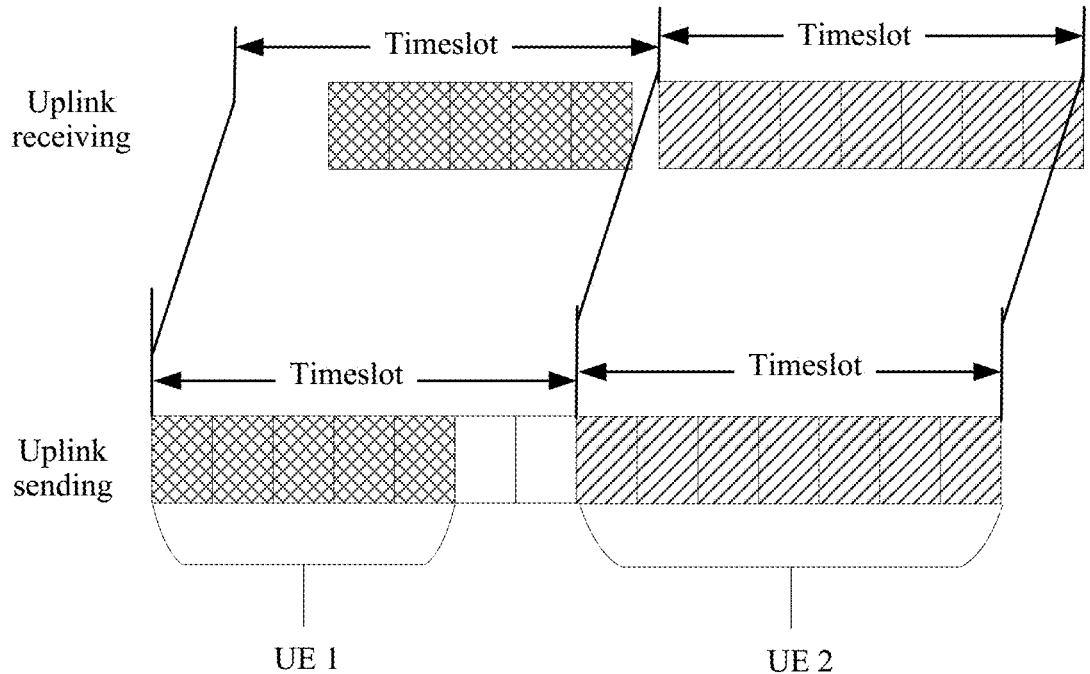

A network device determines a first timing advance of UE, where the first timing advance is equal to a product of a timing advance coefficient and a first time length, the first time length is one of at least two different time lengths that are supported by the UE and that are used to determine a timing advance, and the first timing advance is used by the UE to send uplink information —— S610

The network device receives the uplink information from the UE —— S620

FIG. 6

UPLINK INFORMATION SENDING METHOD AND APPARATUS

CROSS-REFERENCE TO RELATED APPLICATIONS

This application is a continuation of International Application No. PCT/CN2018/089812, filed on Jun. 4, 2018, which claims priority to Chinese Patent Application No. 201710419346.9, filed on Jun. 6, 2017. The disclosures of the aforementioned patent applications are hereby incorporated by reference in their entireties.

TECHNICAL FIELD

This application relates to the communications field, and in particular, to uplink information sending method and apparatus in the wireless communications field.

BACKGROUND

An important feature of uplink transmission is that different user equipment devices (UEs) perform orthogonal multiple access on a time-frequency resource. Specifically, different UEs from a same cell perform uplink transmission without interfering with each other. To ensure uplink transmission orthogonality and avoid intra-cell interference, it is required that time at which signals from different UEs reach a base station is aligned. The base station can correctly decode uplink data sent by the UE, provided that the base station receives the uplink data within a cyclic prefix (CP) range. Therefore, uplink synchronization requires that time at which signals of different UEs from a same subframe reach the base station falls within the CP.

Ultra-reliable and low latency communications (URLLC) is a communication scenario proposed for fifth generation (5G) mobile communication systems. In the URLLC scenario, there is a tough requirement for data transmission reliability and data transmission latency. For example, a latency of an uplink user plane or a downlink user plane cannot exceed 0.5 millisecond (ms), and a bit error rate within 1 ms cannot exceed 0.0001%. Existing uplink synchronization methods for sending uplink information cannot meet the requirements of the 5G mobile communication systems.

SUMMARY

In view of this, this application provides an uplink information sending method, aimed to improve reliability of uplink information transmission and reduce uplink transmission latency. Therefore, requirements of 5G mobile communication systems can be met.

According to a first aspect, an uplink information sending method is provided. The method includes: receiving, by a terminal device, a timing advance coefficient; determining, by the terminal device, a first timing advance based on the timing advance coefficient and a first time length, where the first time length is one of at least two different time lengths that are supported by the terminal device and that are used to determine a timing advance; and sending, by the terminal device, uplink information based on the first timing advance.

A 5G mobile communication system supports a plurality of subcarrier spacings (the subcarrier spacings are applicable to different service types), and different subcarrier spacings are corresponding to different CP lengths. Therefore, different subcarrier spacings have different latency impact resistance performance. For example, in a scenario with a relatively high latency requirement, a shorter time length in the at least two different time lengths may be used to improve uplink synchronization precision, and in a scenario with a relatively low latency requirement, a longer time length in the at least two different time lengths may be used, so that compatibility with more devices is ensured while the latency requirement is met. Therefore, the terminal device uses different timing advances in different scenarios, so that diversified requirements of a 5G mobile communication system for uplink synchronization is satisfied.

Optionally, before the determining, by the terminal device, a first timing advance based on the timing advance coefficient and a first time length, the method further includes: receiving, by the terminal device, first information, where the first information is used to indicate the first time length. Therefore, a network device can flexibly determine, based on an actual situation, a time length used by the terminal device to determine a timing advance.

Optionally, before the determining, by the terminal device, a first timing advance based on the timing advance coefficient and a first time length, the method further includes: receiving, by the terminal device, second information; and determining, by the terminal device, the first time length based on a correspondence between a resource occupied by the second information and the first time length.

After receiving the second information, the terminal device can determine, based on the foregoing correspondence, a time length used by the to-be-sent uplink information, and further determine a timing advance used by the to-be-sent uplink information. Therefore, a network device can flexibly determine, based on an actual situation, a time length used by the terminal device to determine a timing advance.

Optionally, there is a correspondence between the first time length and a service type of the uplink information and/or a resource type corresponding to the uplink information, and before the determining, by the terminal device, a first timing advance based on the timing advance coefficient and a first time length, the method further includes: determining, by the terminal device, the first time length based on the correspondence between the first time length and the service type of the uplink information; and/or determining, by the terminal device, the first time length based on the correspondence between the first time length and the resource type corresponding to the uplink information.

According to the method provided in this embodiment, the terminal device can determine the first time length without a need to exchange information with the network device, so that an uplink information transmission latency is reduced.

Optionally, before the determining, by the terminal device, the first time length, the method further includes: receiving, by the terminal device, third information, where the third information is used to indicate at least one of the service type of the uplink information and the resource type corresponding to the uplink information.

Optionally, the resource type includes at least one of the following parameters: a subcarrier spacing type, a cyclic prefix length, a symbol length, a timeslot length, a working frequency, and a subframe type. Therefore, the terminal device can flexibly determine a time length based on an actual situation.

Optionally, the service type includes at least one of the following parameters: quality of service, a target bit error rate, and a target block error rate. Therefore, the terminal device can flexibly determine a time length based on an actual situation.

Optionally, the method further includes: receiving, by the terminal device, first configuration information, where the first configuration information is used to configure the at least two different time lengths used to determine a timing advance.

The network device may configure, for the terminal device, a time length that meets a requirement of a current communication environment, so that the terminal device can flexibly determine a timing advance.

According to a second aspect, an uplink information sending method is provided. The method includes: when an uplink of a terminal device is out of synchronization, determining, by the terminal device, to use a first resource; sending, by the terminal device, first uplink information to a network device by using the first resource, where the first uplink information includes information other than a random access preamble sequence, a time length of the first resource is less than a time length of a second resource, and the second resource is a resource used when the terminal device sends second uplink information in uplink synchronization state.

According to the method provided in this embodiment, the terminal device can send the information other than the random access preamble sequence without a need to perform uplink synchronization, and the information other than the random access preamble sequence is, for example, emergent service data. Therefore, transmission latency of an uplink information is reduced, and resource utilization is improved.

Optionally, the uplink out-of-synchronization state is a state in which a time synchronization timer of the terminal device expires, and the uplink synchronization state is a state in which the time synchronization timer of the terminal device is running.

Optionally, the first uplink information sent by the terminal device includes scheduling-free uplink information.

In a scheduling-free scenario, the terminal device usually has relatively emergent data that needs to be transmitted. Therefore, the terminal device may send the emergent data before converting the uplink state from out-of-synchronization into synchronization. According to the uplink information sending method provided in this embodiment, the terminal device sends, in the uplink out-of-synchronization state, uplink information by using a resource with a relatively short time length, so that an uplink transmission latency can be reduced while transmission reliability is not compromised.

Optionally, before the sending, by the terminal device, first uplink information to a network device by using the first resource, the method further includes: determining, by the terminal device, a start point of a time domain resource of the first resource based on time of receiving downlink information.

Optionally, before the determining, by the terminal device, to use a first resource, the method further includes: receiving, by the terminal device, second configuration information from the network device, where the second configuration information is used to configure the first resource. Therefore, the network device can flexibly configure a resource used by the terminal device to send uplink information.

According to a third aspect, an uplink information receiving method is provided. The method includes: determining, by a network device, a first timing advance of a terminal device, where the first timing advance is equal to a product of a timing advance coefficient and a first time length, the first time length is one of at least two different time lengths that are supported by the terminal device and that are used to determine a timing advance, and the first timing advance is used by the terminal device to send uplink information; and receiving, by the network device, the uplink information from the terminal device.

According to the uplink information receiving method provided in this embodiment, the network device determines, based on different time lengths supported by the terminal device, timing advances used by the terminal device in different scenarios. For example, in a scenario with a relatively high latency requirement, a shorter time length in the at least two different time lengths may be used to improve uplink synchronization precision, and in a scenario with a relatively low latency requirement, a longer time length in the at least two different time lengths may be used, so that compatibility with more devices is ensured while the latency requirement is met, and diversified requirements of a 5G mobile communication system for uplink synchronization is satisfied.

Optionally, before the receiving, by the network device, the uplink information from the terminal device, the method further includes: sending, by the network device, first information to the terminal device, where the first information is used to indicate the first time length. Therefore, the network device can flexibly determine, based on an actual situation, a time length used by the terminal device.

Optionally, before the receiving, by the network device, the uplink information from the terminal device, the method further includes: sending, by the network device, second information to the terminal device, where there is a correspondence between a resource occupied by the second information and the first time length. Therefore, the network device can flexibly determine, based on an actual situation, a time length used by the terminal device.

Optionally, there is a correspondence between the first time length and a service type of the uplink information and/or a resource type corresponding to the uplink information, and before the receiving, by the network device, the uplink information from the terminal device, the method further includes: determining, by the network device, the first time length based on the correspondence between the first time length and the service type of the uplink information; and/or determining, by the network device, the first time length based on the correspondence between the first time length and the resource type corresponding to the uplink information.

Therefore, the network device can flexibly determine, based on an actual situation, a time length used by the terminal device.

Optionally, the method further includes: sending, by the network device, third information to the terminal device, where the third information is used to indicate at least one of the service type of the uplink information and the resource type corresponding to the uplink information.

The network device may preconfigure a resource for the uplink information to be sent by the terminal device, and the third information is used to indicate the configured resource. Alternatively, the network device may indicate, by using the third information, the service type of the uplink information to be sent by the terminal device, so that the network device can flexibly determine, based on an actual situation, a time length used by the terminal device.

Optionally, the resource type includes at least one of the following parameters: a subcarrier spacing type, a cyclic prefix length, a symbol length, a timeslot length, a working frequency, and a subframe type.

Optionally, the service type includes at least one of the following parameters: quality of service, a target bit error rate, and a target block error rate.

Optionally, the method further includes: sending, by the network device, first configuration information to the terminal device, where the first configuration information is used to configure the at least two different time lengths used to determine a timing advance.

The network device may configure, for the terminal device, a time length that meets a requirement of a current communication environment, so that the terminal device can flexibly determine a timing advance.

According to a fourth aspect, an uplink information receiving method is provided. The method includes: determining, by a network device, a first resource, where a time length of the first resource is less than a time length of a second resource, the first resource is used by a terminal device to send first uplink information in an uplink out-of-synchronization state, the first uplink information includes information other than a random access preamble sequence, and the second resource is used by the terminal device to send second uplink information in an uplink synchronization state; and sending, by the network device, second configuration information to the terminal device, where the second configuration information is used to configure the first resource.

According to the method in this embodiment, the network device may indicate, by using the second configuration information, a size of a time domain resource included in the first resource. When the terminal device is in the uplink out-of-synchronization state, the terminal device determines to use the first resource, and sends the first uplink information to the network device by using the first resource. The first uplink information includes the information other than the random access preamble sequence. For example, the first uplink information may be at least one of service data, feedback information, and request information. Therefore, the network device may receive the information other than the random access preamble sequence without a need to wait for uplink synchronization performed by the terminal device, so that an uplink information transmission latency is reduced, and resource utilization is improved.

Optionally, the method further includes: receiving, by the network device, the first uplink information from the terminal device by using the first resource, where the first uplink information includes scheduling-free uplink information.

In a scheduling-free scenario, the terminal device usually has relatively emergent data that needs to be transmitted. Therefore, the terminal device may send the emergent data before converting the uplink state from out-of-synchronization into synchronization. According to the uplink information sending method provided in this application, the terminal device sends, in the uplink out-of-synchronization state, uplink information by using a resource with a relatively short time length, so that an uplink transmission latency can be reduced while transmission reliability is not compromised.

Optionally, there is a spacing of at least one time unit between the first resource and the second resource on time domain.

According to the method provided in this embodiment, when the terminal device is in the uplink out-of-synchronization state, and when time at which the first uplink information reaches the network device is relatively late, because there is the spacing of at least one time unit between the first resource and the second resource, a possibility that uplink information transmitted by using the first resource and uplink information transmitted by using the second resource affect each other is greatly reduced, so that uplink transmission reliability is improved.

Optionally, the uplink out-of-synchronization state is a state in which a time synchronization timer of the terminal device expires, and the uplink synchronization state is a state in which the time synchronization timer of the terminal device is running.

According to a fifth aspect, an uplink information sending apparatus is provided. The apparatus can implement functions performed by the terminal device in the method in the first aspect. The functions may be implemented by using hardware, or may be implemented by executing corresponding software by hardware. The hardware or software includes one or more units or modules corresponding to the foregoing functions.

In a possible design, a structure of the apparatus includes a processor and a transceiver. The processor is configured to support the apparatus to perform corresponding functions in the method in the first aspect. The transceiver is configured to support communication between the apparatus and another network element. The apparatus may further include a memory. The memory is configured to be coupled to the processor, and the memory stores a program instruction and data that are necessary for the apparatus.

According to a sixth aspect, an uplink information sending apparatus is provided. The apparatus can implement functions performed by the terminal device in the method in the second aspect. The functions may be implemented by using hardware, or may be implemented by executing corresponding software by hardware. The hardware or software includes one or more units or modules corresponding to the foregoing functions.

In a possible design, a structure of the apparatus includes a processor and a transceiver. The processor is configured to support the apparatus to perform corresponding functions in the method in the second aspect. The transceiver is configured to support communication between the apparatus and another network element. The apparatus may further include a memory. The memory is configured to be coupled to the processor, and the memory stores a program instruction and data that are necessary for the apparatus.

According to a seventh aspect, an uplink information receiving apparatus is provided. The apparatus can implement functions performed by the network device in the method in the third aspect. The functions may be implemented by using hardware, or may be implemented by executing corresponding software by hardware. The hardware or software includes one or more units or modules corresponding to the foregoing functions.

In a possible design, a structure of the apparatus includes a processor and a transceiver. The processor is configured to support the apparatus to perform corresponding functions in the method in the third aspect. The transceiver is configured to support communication between the apparatus and another network element. The apparatus may further include a memory. The memory is configured to be coupled to the processor, and the memory stores a program instruction and data that are necessary for the apparatus.

According to an eighth aspect, an uplink information receiving apparatus is provided. The apparatus can implement functions performed by the network device in the method in the fourth aspect. The functions may be implemented by using hardware, or may be implemented by executing corresponding software by hardware. The hardware or software includes one or more units or modules corresponding to the foregoing functions.

In a possible design, a structure of the apparatus includes a processor and a transceiver. The processor is configured to support the apparatus to perform corresponding functions in the method in the fourth aspect. The transceiver is configured to support communication between the apparatus and another network element. The apparatus may further include a memory. The memory is configured to be coupled to the processor, and the memory stores a program instruction and data that are necessary for the apparatus.

According to a ninth aspect, this application further provides a network system, and the network system includes the uplink information sending apparatus according to the fifth aspect and the uplink information receiving apparatus according to the seventh aspect.

According to a tenth aspect, this application further provides a network system, and the network system includes the uplink information sending apparatus according to the sixth aspect and the uplink information receiving apparatus according to the eighth aspect.

According to an eleventh aspect, a computer program product is provided, the computer program product includes computer program code, and when the computer program code is run by a communication unit, a processing unit or a transceiver, or a processor of a terminal device, the terminal device performs the method in the first aspect.

According to a twelfth aspect, a computer program product is provided, the computer program product includes computer program code, and when the computer program code is run by a communication unit, a processing unit or a transceiver, or a processor of a terminal device, the terminal device performs the method in the second aspect.

According to a thirteenth aspect, a computer program product is provided, the computer program product includes computer program code, and when the computer program code is run by a communication unit, a processing unit or a transceiver, or a processor of a network device, a network device performs the method in the third aspect.

According to a fourteenth aspect, a computer program product is provided, the computer program product includes computer program code, and when the computer program code is run by a communication unit, a processing unit or a transceiver, or a processor of a terminal device, a network device performs the method in the fourth aspect.

According to a fifteenth aspect, a computer storage medium is provided, and is configured to store a computer software instruction that is used by the terminal device in the first aspect, and the computer software instruction includes a program designed to perform the method in the first aspect.

According to a sixteenth aspect, a computer storage medium is provided, and is configured to store a computer software instruction that is used by the terminal device in the second aspect, and the computer software instruction includes a program designed to perform the method in the second aspect.

According to a seventeenth aspect, a computer storage medium is provided, and is configured to store a computer software instruction that is used by the network device in the third aspect, and the computer software instruction includes a program designed to perform the method in the third aspect.

According to an eighteenth aspect, a computer storage medium is provided, and is configured to store a computer software instruction that is used by the network device in the fourth aspect, and the computer software instruction includes a program designed to perform the method in the fourth aspect.

According to a nineteenth aspect, a communication chip is provided, the communication chip stores an instruction, and when the instruction is run on a terminal device, the communication chip performs the method in the first aspect.

According to a twentieth aspect, a communication chip is provided, the communication chip stores an instruction, and when the instruction is run on a terminal device, the communication chip performs the method in the second aspect.

According to a twenty-first aspect, a communication chip is provided, the communication chip stores an instruction, and when the instruction is run on a network device, the communication chip performs the method in the third aspect.

According to a twenty-second aspect, a communication chip is provided, the communication chip stores an instruction, and when the instruction is run on a network device, the communication chip performs the method in the fourth aspect.

BRIEF DESCRIPTION OF DRAWINGS

FIG. 5 is a schematic diagram of a resource used by UE to send uplink information according to an embodiment of this application;

FIG. 6 is a flowchart of an uplink information receiving method according to an embodiment of this application;

DESCRIPTION OF EMBODIMENTS

The following describes technical solutions of this application with reference to the accompanying drawings.

Figure 1:
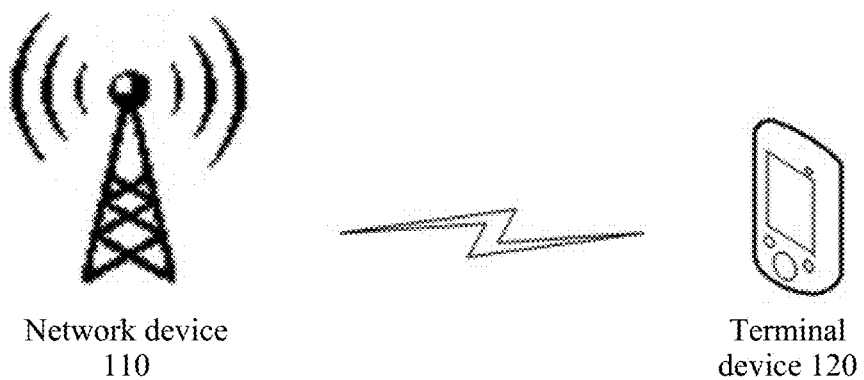
FIG. 1 shows a general diagram of a mobile communication system in which embodiments of this application can be applied.

FIG. 1 shows a communication system 100 in which embodiments of this application can be implemented. The communication system 100 includes at least a network device 110 and a terminal device 120. The network device 110 communicates with the terminal device 120 by using a wireless network. When the terminal device 120 sends information such as data, a wireless communication module of the terminal device 120 may encode the information for transmission. Specifically, the wireless communication module obtains a specific quantity of data bits to be sent to the network device 110 by using a communication channel. The data bits are, for example, data bits generated by a processing module, received from another device, or stored in a storage module. The data bits may be included in one or more transport blocks (which may also be referred to as information blocks or data blocks), and the transport block may be segmented to generate a plurality of code blocks.

The terminal device in this application may be referred to as an access terminal, a user equipment device (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular telephone, a handheld device with a wireless communication function, a computing device or another processing device connected to a wireless modem, an in-vehicle device, a wearable device, or user equipment in a 5 G mobile communication system.

The network device may be a base transceiver station (BTS) in a Code Division Multiple Access (CDMA) system, a NodeB (NB) in a Wideband Code Division Multiple Access (WCDMA) system, an evolved NodeB (evolved NodeB, eNB) in a Long Term Evolution (LTE) system, or may be a new radio NodeB (gNB) in a 5 G mobile communication system. The foregoing are merely examples, and the network device may alternatively be a relay station, an access point, an in-vehicle device, a wearable device, or another type of device.

The foregoing communication systems applicable to this application are merely examples, and the communication systems applicable to this application are not limited thereto. Also, the communication system may include any quantity of network devices and terminal devices. The communication system 100 applicable to this application may further be a device-to-device (D2D) communication system, in which the network device 110 and the terminal device 120 are two devices that communicate with each other in the D2D communication system.

For ease of understanding of this application, before an uplink information sending method provided in this application is disclosed, concepts involved in this application are briefly described.

To ensure time synchronization at a base station side, to be specific, to ensure that uplink signals from different terminal devices (referred to as UEs hereinafter) reach the base station at an expected time, a communication system may use an uplink timing advance mechanism, and the UE sends uplink information based on a timing advance. For the UE, the timing advance is essentially a negative offset between a start moment of a downlink subframe and a start moment of an uplink subframe. By properly controlling an offset of each UE, the base station can control time at which the uplink signals from the different UEs reach the base station. UE that is relatively close to the base station may send uplink information based on a relatively shorter timing advance, and UE that is relatively far from the base station needs to send uplink information based on a relatively longer timing advance due to a relatively large signal transmission latency.

Figure 2:
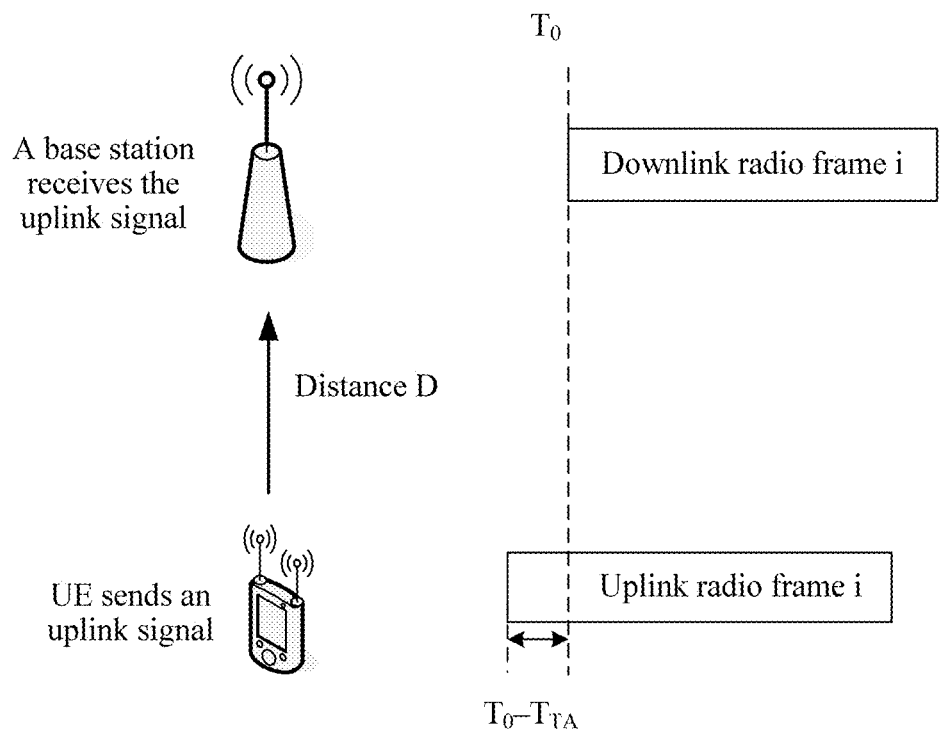
FIG. 2 is a schematic diagram of sending uplink information by UE based on a timing advance.

The base station notifies the UE of a timing advance by using a timing advance command (TAC), and different UEs correspond to different timing advances. FIG. 2 is a schematic diagram of sending uplink information by UE based on a timing advance. In FIG. 2, if a signal transmission distance between the UE and a base station is D, and the base station expects to receive, at a moment $T_0$, an uplink signal from the UE, the UE needs to send the uplink signal at a moment $T_0$-$T_{T4}$. $T_{T4}$ represents a timing advance, a value of the timing advance is D/c, and c represents a transmission rate of an electromagnetic wave. Because the UE has mobility, the transmission distance D of a signal between the UE and the base station also changes. Therefore, the UE needs to constantly adjust the value of the timing advance, to ensure that an error between a moment at which the uplink signal reaches the base station and a moment at which the base station expects the uplink signal to reach the base station is within an acceptable range.

The base station determines a timing advance of each UE by measuring an uplink signal transmitted by the UE. Theoretically, the base station can measure a timing advance based on any uplink signal sent by the UE, and the base station may notify the UE of the timing advance in the following two manners.

Manner 1:

In a random access process, the base station may notify the UE of the timing advance by using a TAC field of a random access response (RAR). In this case, the base station determines the timing advance by measuring a preamble sequence sent by the UE. A size of the TAC field of the RAR may be, for example, 11 bits, and a range of a corresponding timing advance coefficient is 0 to 1282. For random access, a value of a current uplink timing advance is obtained by multiplying the timing advance coefficient by $16T_s$ where $16T_s$ is a time length, and in an LTE system for example, $T_s=1/(15000\times2048)$ second.

Manner 2:

In a radio resource control (RRC) connected mode, the base station may send the timing advance to the UE by using a timing advance command media access control control element (TAC MAC CE).

The UE performs uplink synchronization with the base station in a random access process. However, communication environment of the UE may change with time, and consequently a timing advance set in the random access process is no longer applicable to the new communication environment. For example:

when the UE is moving at a high speed, a transmission latency between the UE and the base station changes greatly in a short period of time;

when an original transmission path is switched to a new communication path, a transmission latency of the new communication path is greatly different from that of the original communication path;

a crystal oscillator offset of the UE, when accumulated in a long period of time, may cause an uplink timing error; and Doppler Frequency Shift Caused by UE's Movement.

Therefore, the UE needs to constantly update its timing advance.

A size of a TAC field of the TAC MAC CE may be, for example, 6 bits, and a range of a corresponding timing advance coefficient is 0 to 63. A timing advance coefficient received by the UE (to be specific, the timing advance coefficient indicated by the TAC field) is an adjustment amount of a current timing advance coefficient relative to a previous timing advance coefficient. For example, if the previous timing advance coefficient is $N_{TA,old}$, and the timing advance coefficient currently received by the UE, as indicated in the TAC field of the TAC MAC CE, is $T_4$, then a value of a current timing advance equals to $N_{TA,new}$ times $16T_s$, where $N_{TA,new}=N_{TA,old}+(T_4-31)$.

Figure 3:
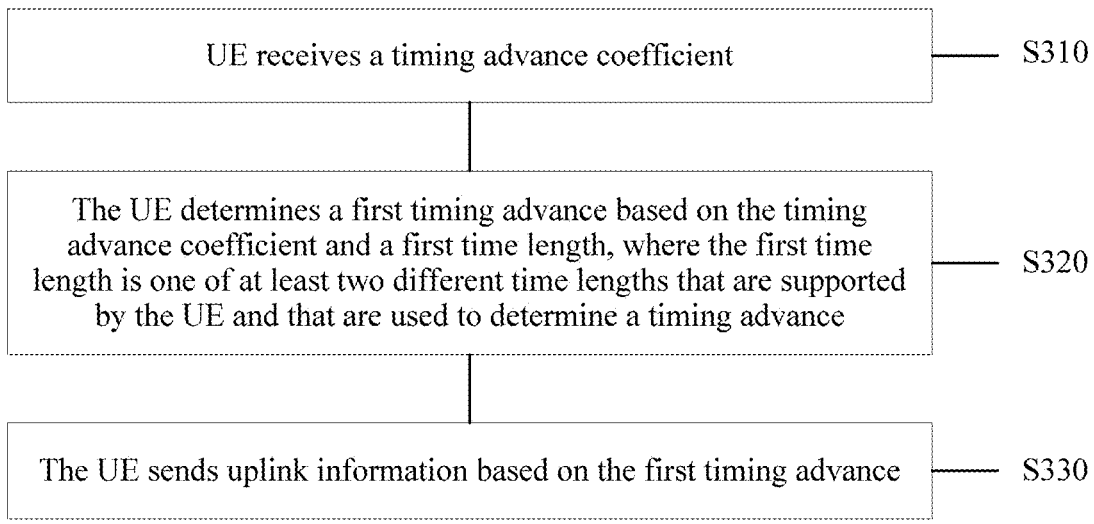
FIG. 3 is a flowchart of an uplink information sending method according to an embodiment of this application.

FIG. 3 is a flowchart of an uplink information sending method according to an embodiment of this application. The method 300 includes the following steps:

S310. UE receives a timing advance coefficient.

S320. The UE determines a first timing advance based on the timing advance coefficient and a first time length, where the first time length is one of at least two different time lengths that are supported by the UE and that are used to determine a timing advance.

S330. The UE sends uplink information based on the first timing advance.

In an LTE system for example, the timing advance is $T_{TA}$, and $T_{TA}=(N_{TA}+N_{TA\_offset})\times T_S$, where $N_{TA}=T_A\times 16$, and $T_A$ corresponds to a TAC field of an RAR; or $N_{TA}=N_{TA\_old}+(T_A-31)\times 16$; and $T_{TA}$ corresponds to a TAC field of a TAC MAC CE. $T_A$ represents the timing advance coefficient received by the UE, a specific value of $T_A$ is indicated by the TAC field of the RAR or the TAC field of the TAC MAC CE, and $N_{TA\_old}$ represents $N_{TA}$ stored by the UE last time. It can be learned that in the LTE system, when the UE determines the timing advance for sending the uplink information, a time granularity corresponding to the timing advance coefficient indicated by a base station is $16T_s$, where $T_s$ is a fixed value in the LTE system. To be specific, a time granularity used by the UE in the LTE system to determine the timing advance for sending the uplink information is fixed.

In embodiments of this application, the UE supports at least two different time lengths (namely, "time granularities", used to determine the timing advance for sending the uplink information). Therefore, the UE needs to determine a currently available time length (for example, the first time length) from the at least two different time lengths, to determine a timing advance based on the first time length and the timing advance coefficient. The at least two different time lengths correspond to different communication requirements. The value of the timing advance coefficient received by the UE indicates a quantity of first time lengths by which the UE needs to adjust time for sending the uplink information. For example, if the timing advance coefficient received by the UE is M, and the first time length is $16T_s$, the UE needs to adjust the time for sending the uplink information by $M\times 16T_s$. The UE may alternatively adjust, based on another parameter, the time for sending the uplink information, and this is not limited in this application.

A 5G mobile communication system supports a plurality of subcarrier spacings (different subcarrier spacings are applicable to different service types), and symbols of different subcarrier spacings correspond to different CP lengths respectively. Accordingly, different subcarrier spacings correspond to different performances in latency impact resistance. Therefore, the UE uses different timing advances in different scenarios, so that diversified requirements of a 5G mobile communication system for uplink synchronization is satisfied.

For example, the at least two different time lengths correspond to different quality of service requirements. In the LTE system for example, a time length used to determine a timing advance during uplink synchronization is $16T_s$, and the time length is used to serve data transmission whose uplink bit error rate is 10% and that has a relatively low transmission latency requirement. In an enhanced mobile broadband (eMBB) scenario, because the eMBB scenario has a low requirement for transmission reliability and latency, a time length of $16T_s$ may be used to determine a timing advance, to complete uplink synchronization, so that the eMBB scenario can be compatible with more terminal devices while a transmission requirement is met. In a URLLC scenario, however, because the URLLC scenario has a relatively high requirement for transmission reliability and latency, a time length shorter than $16T_s$ may be used to determine a timing advance, to reduce a bit error rate and a latency in uplink transmission.

For another example, the at least two different time lengths used to determine a timing advance correspond to different subcarrier spacings. In the 5G mobile communication system, different subcarrier spacings are used during initial access and service data sending, different subcarrier spacings correspond to different sampling rates, and therefore different subcarrier spacings have different latency impact resistance performance. During the initial access and the service data sending, different time lengths are used to perform uplink synchronization, so that requirements of a network device for uplink synchronization precision in different scenarios can be met. For example, the UE uses a 15 kHz subcarrier spacing during initial access, and a time length used for uplink synchronization is $16T_s$. The UE uses a 60 kHz subcarrier spacing during service data transmission, and a time length used for uplink synchronization is $8T_s'$ or a shorter length. $T_s$ is corresponding to a sampling rate during transmission that uses the 15 kHz subcarrier spacing, and $T_s'$ is corresponding to a sampling rate during transmission that uses the 60 kHz subcarrier spacing. In this way, a timing advance coefficient received by the UE by using the TAC field of the RAR and a timing advance coefficient received by the UE by using the TAC field of the TAC MAC CE correspond to different time lengths.

Similarly, the at least two different time lengths used to determine a timing advance correspond to different resource types, for example, at least one of the following parameters: a cyclic prefix length, a symbol length, a timeslot length, a working frequency, and a subframe type. In a wireless communication system, at least one of a cyclic prefix length, a symbol length, a timeslot length, a working frequency, and a subframe type affects latency spread resistance performance or frequency fading and offset resistance performance when the UE transmits the uplink information. Therefore, when the UE sends the uplink information by using any combination of the foregoing parameters, the UE needs to use different time lengths as granularities for adjusting uplink information transmission time, to ensure a quality of service requirement of an uplink service of the UE. Likewise, the at least two different time lengths correspond to different service types, for example, at least one of quality of service, a target bit error rate, and a target block error rate. For different service types, the UE needs to adjust uplink information sending time based on different time lengths.

To meet the diversified requirements of the 5G mobile communication systems for uplink synchronization, in another manner, regardless of the resource type or the service type of the uplink information sent by the UE, the base station adjusts time at which the UE sends the uplink information by using a minimum time granularity. However, if there is a fixed quantity of bits used to indicate the timing advance coefficient, when time granularities are different, a timing advance coefficient sent by the base station each time corresponds to a different timing advance range. For example, if the timing advance coefficient indicated by the base station is 6 bits, and a range of the timing advance coefficient is [0, 63], when a corresponding time granularity $16T_s$, is the timing advance range corresponding to the timing advance coefficient sent by the base station each time is $[0, 63]\times 16T_s$. When a corresponding time granularity is $8T_s$, the timing advance range corresponding to the timing advance coefficient sent by the base station each time is $[0, 63]\times 16T_s$; and so on. In this way, if the base station always uses the minimum granularity to adjust the time at which the UE sends the uplink information, the timing advance range corresponding to the timing advance coefficient sent by the base station each time is always quite small. Therefore, the base station needs to frequently send the timing advance coefficient to resolve an uplink timing offset problem caused by UE's movement, a crystal oscillator offset, and the like, and consequently resource use efficiency of the base station is low. Therefore, the UE needs to support a plurality of different time lengths, to determine the timing advance for sending the uplink information, so as to meet transmission requirements of uplink information corresponding to different resource types and/or service types.

When the UE supports a plurality of different time lengths, to determine the timing advance required for sending the uplink information, the UE needs to determine the timing advance based on the timing advance coefficient and one of the at least two different time lengths that are supported by the UE and that are used to determine a timing advance. To be specific, the UE first determines one time length (for example, the first time length) from the at least two different time lengths. After that, the UE determines a timing advance (for example, the first timing advance) based on the determined time length and the timing advance coefficient, and sends the uplink information based on the timing advance (for example, the first timing advance). Specific content of the uplink information is not limited in this application.

Optionally, when determining the first timing advance based on the received timing advance coefficient and the first time length, the UE determines an adjustment value of the first timing advance based on a product of the received timing advance coefficient and the first time length. For example, if the received timing advance coefficient is $T_A$, and the first time length is $\Delta T$, the adjustment value of the first timing advance is $T_A \times \Delta T$. The first timing advance determined by the UE based on the received timing advance coefficient and the first time length may be the adjustment value of the timing advance. For example, when the timing advance coefficient in the step S310 above is a value indicated by the TAC field of the RAR, the first timing advance in the step S320 is the adjustment value $T_A \times \Delta T$ timing advance. Optionally, when determining the first timing advance based on the timing advance coefficient and the first time length, the UE further determines the first timing advance with reference to a historically stored timing advance. For example, if the timing advance coefficient received by the UE is $T_A$, and the historical timing advance is $T_1$, the first timing advance is $T_1+(T_A-M) \times \Delta T$, where M is a constant, or $$M = \frac{N}{2},$$

$N=2^{n-1}-1$, and n is a quantity of bits used to indicate information about the timing advance coefficient. The first timing advance used by the UE to send the uplink information may be related to another parameter in addition to the product of the timing advance coefficient and the first time length, and this is not limited herein. For example, the first timing advance used by the UE to send the uplink information is the adjustment value plus the product of the timing advance coefficient and the first time length, and the adjustment value is 20 microseconds (µs) or 0. The UE may determine the adjustment value based on a standard of a carrier used for sending the uplink information. For example, the adjustment value is 0 for a frequency division duplex (FDD) system, and the adjustment value is 20 µs for a time division duplex (TDD) system.

It should be noted that, unless otherwise specified, the time length (for example, "the first time length") in this application is a period of time, and may also be referred to as a time granularity for timing advance adjustment. A specific name of the foregoing parameter is not limited in this application.

The timing advance coefficient in the step S310 may be a value indicated by the network device to the UE, and the UE may obtain the timing advance coefficient in the above method 300 by using the method for obtaining the timing advance coefficient in the LTE system. This is not specifically limited herein.

The UE may send uplink data by using the manner shown in FIG. 2. For example, the UE may determine a downlink radio frame i based on a received downlink radio frame i−1, and determine, based on the timing advance $T_{TA}$, that a start moment of the uplink radio frame i is $T_0-T_{TA}$, where $T_0$ is a start moment at which the UE receives the downlink radio frame i.

After determining the start moment of the uplink radio frame i, the UE can determine the time for sending the uplink information. The time for sending the uplink information by the UE may be a part of time in the uplink radio frame.

Optionally, before the UE determines the first timing advance based on the timing advance coefficient and the first time length, the method 300 further includes:

S301. The UE receives first information, where the first information indicates the first time length.

The first information may be, for example, a TAC MAC CE or an RAR. For example, it is assumed that the current UE supports four time granularities: granularity 1, granularity 2, granularity 3, and granularity 4. After receiving random access information from the UE, the network device indicates, in the RAR, a granularity used by the UE to determine the timing advance when currently sending the uplink information. The network device may determine a time granularity based on a subcarrier spacing used by the uplink information to be sent by the UE. Alternatively, the network device may determine, based on whether the uplink information to be sent by the UE is uplink information of eMBB or uplink information of URLLC, a time granularity used by the UE. It should be noted that the first information may indicate the first time length directly or indirectly. For example, if the granularity 1 is $16T_s$, the granularity 2 is $8T_s$, the granularity 3 is $4T_s$, and the granularity 4 is $2T_s$, the first information may indicate only 16 when indicating the granularity 1, may indicate only 8 when indicating the granularity 2, may indicate only 4 when indicating the granularity 3, and may indicate only 2 when indicating the granularity 4. A value of $T_s$ is preset for the UE. Alternatively, when indicating a granularity, the first information directly indicates that the granularity 1 is $16T_s$, the granularity 2 is $8T_s$, the granularity 3 is $4T_s$, and the granularity 4 is $2T_s$. To be specific, after receiving the first information, the UE may determine the first time length based on the first information. A form of the first information is not limited herein.

Therefore, the network device can flexibly determine, based on an actual situation, a time length used by the UE to determine a timing advance. In other words, the network device can flexibly determine, based on an actual situation, a time granularity used by the UE to determine a timing advance.

The first information and information indicating the timing advance coefficient may be located in a same data packet, or the first information and information indicating the timing advance coefficient may be separately located in different data packets.

Optionally, before the UE determines the first timing advance based on the timing advance coefficient and the first time length, the method 300 further includes:

S302. The UE receives second information.

S303. The UE determines the first time length based on a correspondence between a resource occupied by the second information and the first time length.

The second information may be any information received by the UE from the network device. There is a correspondence between the resource occupied by the second information and the first time length, and the correspondence may be specified in a communication system, or may be indicated by the network device to the UE before sending the second information. For example, the correspondence may be a correspondence between a time domain resource occupied by the second information and the first time length. The correspondence may be a correspondence between a frequency domain resource occupied by the second information and the first time length. The correspondence may be a correspondence between a code domain resource occupied by the second information and the first time length. The correspondence may be a correspondence between the first time length and at least two resources of a time domain resource, a frequency domain resource, and a code domain resource occupied by the second information.

After receiving the second information, the UE can determine, based on the foregoing correspondence, the first time length corresponding to the timing advance. The UE can also determine, based on the first time length and the received timing advance coefficient, the first timing advance used to send the uplink information.

Therefore, the network device can flexibly determine, based on an actual situation, a time length used by the UE to determine a timing advance. In other words, the network device can flexibly determine, based on an actual situation, a time granularity used by the UE to determine a timing advance.

The second information and information indicating the timing advance coefficient may be located in a same data packet, or the second information and information indicating the timing advance coefficient may be separately located in different data packets. Optionally, the second information may be the information indicating the timing advance coefficient.

Optionally, there is a correspondence between the first time length and a service type of the uplink information and/or a resource type corresponding to the uplink information, and before the UE determines the first timing advance based on the timing advance coefficient and the first time length, the method 300 further includes:

S304. The UE determines the first time length based on the correspondence between the first time length and the service type of the uplink information, and/or the UE determines the first time length based on the correspondence between the first time length and the resource type corresponding to the uplink information.

In the embodiments of this application, the UE may not receive the first information or the second information, but determines the first time length based on the service type of the uplink information and/or the resource type corresponding to the uplink information. The service type may be, for example, an eMBB service and a URLLC service, and the resource type may be, for example, a type of a subcarrier spacing used to send the uplink information. The correspondence in S304 may be specified in the communication system, or may be preconfigured by the network device. For example, the communication system specifies that when the URLLC service (corresponding to a quality of service requirement-1) is sent, the first time length used by the UE to determine the timing advance is A. When the eMBB service (corresponding to a quality of service requirement-2), the first time length used by the UE to determine the timing advance is B. In this way, if determining that the sent uplink information is the URLLC service, the UE determines that the first time length is A. If determining that the sent uplink information is the eMBB service, the UE determines that the first time length is B. Optionally, that the first time length corresponding to the URLLC service is A and the first time length corresponding to the eMBB service is B may be preconfigured by the network device for the UE.

The method for determining the first time length by the UE based on the service type of the uplink information or the resource type corresponding to the uplink information is similar to the method for determining the first time length by the network device. For brevity, details are not described herein. Alternatively, the UE may determine the first time length based on both the service type of the uplink information and the resource type corresponding to the uplink information. For example, the service type of the uplink information includes a service whose target bit error rate is 10% and a service whose target bit error rate is 1%, and the resource type corresponding to the uplink information includes a resource whose subcarrier spacing is 15 kHz and a resource whose subcarrier spacing is 60 kHz. There are following four resource and service types that may be selected by one piece of uplink information:

A resource type corresponding to the service whose target bit error rate is 10% is the resource whose subcarrier spacing is 15 kHz;

A resource type corresponding to the service whose target bit error rate is 1% is the resource whose subcarrier spacing is 15 kHz;

A resource type corresponding to the service whose target bit error rate is 10% is the resource whose subcarrier spacing is 60 kHz; and A resource type corresponding to the service whose target bit error rate is 1% is the resource whose subcarrier spacing is 60 kHz.

The four cases respectively correspond to different first time lengths, and the UE determines the first time length based on both the service type of the uplink information and the resource type corresponding to the uplink information.

According to the method provided in this embodiment, the UE can determine the first time length without a need to exchange information with the network device, so that uplink information transmission latency is reduced.

Optionally, before the UE determines the first time length, the method 300 further includes:

S305. The UE receives third information, where the third information is used to indicate at least one of the service type of the uplink information and the resource type corresponding to the uplink information.

The network device may pre-configure a resource for the uplink information to be sent by the UE, and the third information is used to indicate the configured resource. Alternatively, the network device may indicate, by using the third information, the service type of the uplink information to be sent by the UE, so that the UE may determine the first time length based on the service type of the uplink information and/or the resource type corresponding to the uplink information.

Optionally, in this application, the resource type includes at least one of the following parameters: a subcarrier spacing type, a cyclic prefix length, a symbol length, a timeslot length, a working frequency, and a subframe type. The correspondence between the first time length and the service type of the uplink information and/or the resource type corresponding to the uplink information is described in S304. Differently, the UE needs to determine, by using the third information, the service type of the uplink information and/or the resource type corresponding to the uplink information, and determine the first time length based on the service type of the uplink information and/or the resource type corresponding to the uplink information.

In the wireless communications system, a longer cyclic prefix length indicates smaller latency spread impact from a radio channel during uplink information transmission, and if a transmission requirement remains unchanged, a larger time granularity can be used when the timing advance used for sending the uplink information is determined. A longer symbol length and timeslot length of the uplink information indicates smaller short-time latency spread impact during uplink information transmission, and if a transmission requirement remains unchanged, a larger time granularity can be used when the timing advance used for sending the uplink information is determined. For the working frequency, a higher working frequency used for transmitting the uplink information indicates a larger corresponding subcarrier width, a smaller symbol length, a smaller timeslot length, a smaller CP length, and larger latency spread impact from a radio channel, and if a transmission requirement remains unchanged, a smaller time granularity can be used when the timing advance used for sending the uplink information is determined. In addition, a subframe type or a timeslot type used for uplink information transmission also affects latency spread resistance performance or frequency fading and offset resistance performance of the UE during uplink information transmission. For example, all time of some timeslots is used for uplink transmission, and some timeslots include time for conversion between uplink and downlink. The UE needs to determine, by using different time granularities, a timing advance for sending uplink information, to meet a transmission requirement of the uplink information.

Therefore, to ensure a quality of service requirement of an uplink service of the UE, for different foregoing parameters, the UE needs to determine, by using different time lengths used to determine a timing advance, a timing advance for sending uplink information.

Therefore, the wireless communication system can flexibly use, based on an actual situation, different time granularities to perform uplink synchronization of the UE.

Optionally, in this application, the service type includes at least one of the following parameters: quality of service, a target bit error rate, and a target block error rate.

A smaller time granularity used to determine the timing advance for sending the uplink information indicates more precise transmission timing adjustment for sending the uplink information, so that higher quality of service, a lower target bit error rate, and a lower target block error rate can be obtained. However, some devices may not support a relatively small time granularity. Therefore, the wireless communication system can flexibly use, based on an actual situation, different time granularities to perform uplink synchronization of the UE.

Optionally, the method 300 further includes the following step:

S340. The UE receives first configuration information, where the first configuration information is used to configure the at least two different time lengths used to determine a timing advance.

The network device may configure, for the UE, a time length that meets a requirement of a current communication environment, so that the UE can flexibly determine a timing advance. For example, the UE supports four time lengths used to determine a timing advance. When the current UE is in a URLLC communication environment, the network device may configure, by using the first configuration information, two shorter time lengths in the four time lengths for the UE to determine a timing advance. In this way, when indicating the first time length to the UE by using the first information, the network device may select, as the first time length, one time length from only the two shorter time lengths used to determine a timing advance. When the UE is in an eMBB communication environment, the network device may configure, by using the first configuration information, two longer time lengths in the four time lengths for the UE. When indicating the first time length to the UE by using the first information, the network device may select one time length from only the two longer time lengths as the first time length. Therefore, the UE may use a relatively short time length to more precisely determine a timing advance, so that time at which the uplink information reaches the network device is more precise, uplink information transmission reliability is improved, and an uplink information transmission latency is reduced. If a transmission requirement is met, the UE may use a relatively long time length to avoid relatively large implementation complexity caused when the base station configures a plurality of time lengths.

It should be noted that the first configuration information may be used to directly or indirectly configure the at least two different time lengths used to determine a timing advance. For example, if the granularity 1 is $16T_s$, the granularity 2 is $8T_s$, the granularity 3 is $4T_s$, and the granularity 4 is $2T_s$, the first configuration information may indicate only 16 when indicating the granularity 1, may indicate only 8 when indicating the granularity 2, may indicate only 4 when indicating the granularity 3, and may indicate only 2 when indicating the granularity 4. The value of $T_s$ is preset for the UE. Alternatively, when indicating a granularity, the first configuration information directly indicates that the granularity 1 is $16T_s$, the granularity 2 is $8T_s$, the granularity 3 is $4T_s$, and the granularity 4 is $2T_s$.

Optionally, the UE may report a capability of determining a timing advance to the network device. For example, the UE reports that the UE supports the at least two different time lengths used to determine a timing advance, and the network device configures, for the UE by using the first configuration information based on the capability reported by the UE, one or more time lengths used by the UE to determine a timing advance. Alternatively, the network device indicates the first time length to the UE by using the first information based on the capability reported by the UE.

Figure 4:
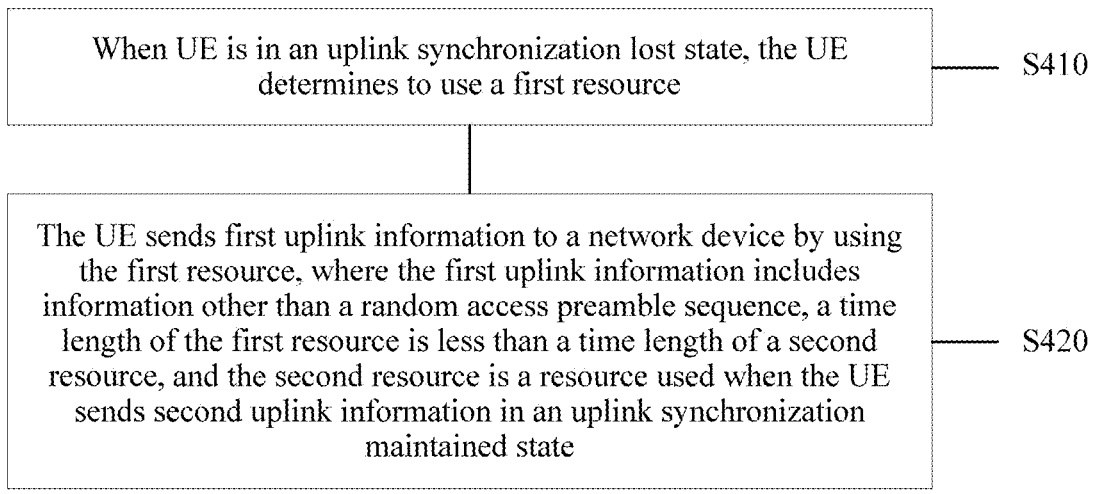
FIG. 4 is a flowchart of an uplink information sending method according to an embodiment of this application.

FIG. 4 is a schematic flowchart of an uplink information sending method according to another embodiment of this application. The method 400 includes the following steps:

S410. When UE is in an uplink out-of-synchronization state, the UE determines to use a first resource.

S420. The UE sends first uplink information to a network device by using the first resource, where the first uplink information includes information other than a random access preamble sequence, a time length of the first resource is less than a time length of a second resource, and the second resource is a resource used when the UE sends second uplink information in an uplink synchronization state.

If a terminal device does not send uplink information to the network device within a period of time, the network device does not know, within a specific time period, a specific terminal device that needs to send uplink data, and does not know a size of uplink data that needs to be sent by a particular terminal device. Therefore, when the UE needs to transmit uplink data, the UE may be in the uplink out-of-synchronization state. URLLC data is usually burst and emergent. In this state, if the UE sends the random access preamble sequence to the network device, waits to determine a timing advance based on a timing advance coefficient that is sent by the network device based on the received random access preamble sequence, and then sends uplink URLLC data based on the timing advance, adverse impact is caused to a latency characteristic of the uplink URLLC data. Certainly, alternatively, the network device may enable, by frequently sending the timing advance coefficient to the UE, the UE to keep the uplink synchronization state. However, if the UE does not need to transmit uplink information in a quite long period of time, frequently sending the timing advance coefficient by the network device causes a problem of low resource use efficiency.

In this embodiment, the UE may determine whether the UE is in the uplink out-of-synchronization state or the uplink synchronization state. For a specific determining method, refer to the following related description.

When the UE is in the uplink out-of-synchronization state, the UE determines to use the first resource, and sends the first uplink information to the network device by using the first resource. The first uplink information includes the information other than the random access preamble sequence. For example, the first uplink information may be at least one of service data, feedback information, and scheduling request information.

For example, the service data may be uplink URLLC data to be sent by the UE. The feedback information may be a hybrid automatic repeat request (HARQ) acknowledgement (HARQ-ACK) for downlink URLLC data received by the UE. If HARQ transmission is supported, after the UE receives the downlink URLLC data, the UE feeds back an acknowledgement (ACK) on a physical uplink control channel (PUCCH) if the UE correctly receives the downlink URLLC data, and the UE feeds back a negative acknowledgement (NACK) on the PUCCH if the UE incorrectly receives the downlink URLLC data. The ACK and the NACK are collectively referred to as the HARQ-ACK. For uplink transmission, the UE may notify, by using a scheduling request (SR), the network device whether an uplink resource is required for uplink shared channel (UL-SCH) transmission. After receiving the SR, the network device allocates the uplink resource to the UE, so that the UE uses the uplink resource to send uplink data. The UE sends a scheduling request to a base station, and the base station notifies, by using scheduling indication information, the UE of a resource used to send uplink data. To enable the base station to quickly schedule the UE that is to send the URLLC data, the SR sent by the UE may be classified into a UL data request for URLLC and a UL data request for eMBB.

The terminal device may alternatively perform uplink data transmission by using an uplink grant free (UL grant free) technology, to effectively meet a requirement of the URLLC technology for data transmission reliability and a low latency. The uplink grant free may also be referred to as uplink scheduling-free. When the UL grant free technology is used, uplink data transmission of the terminal device no longer depends on a dynamic notification of the network device, and the network device configures, for the terminal device by sending preconfigured information to the terminal device, a resource used for sending uplink data. Therefore, this method can save time in which the terminal device requests uplink scheduling from the network device, the network device receives an uplink scheduling request message and sends scheduling information to the terminal device, and the like. However, when performing uplink data transmission by using the UL grant free technology, the terminal device may be in the uplink out-of-synchronization state. To ensure that the UE can send the first uplink information to the network device by using the first resource when the UE has an uplink transmission requirement but has not obtained a timing advance used for sending uplink information, the first uplink information includes the information other than the random access preamble sequence, for example, scheduling-free uplink data, an uplink data scheduling request, and feedback information corresponding to downlink data. It should be noted that, the first uplink information may include the random access preamble sequence in addition to "the information other than the random access preamble sequence".

Therefore, the UE can send the information other than the random access preamble sequence without a need to send the random access preamble sequence to perform uplink synchronization, or the UE may send the random access preamble sequence with other information, so that an uplink information transmission latency is reduced, and resource utilization is improved.

The network device may pre-configure the first resource. As shown in FIG. 5, a time domain resource of the first resource is located in one of a plurality of timeslots, and a time end point of the time domain resource of the first resource is earlier than an end point of the timeslot. Optionally, a time domain start location of the first resource coincides with a start location of the timeslot. In FIG. 5, the first resource occupies first five symbols of seven symbols included in one timeslot. In this way, even if UE1 is in an uplink out-of-synchronization state, when the UE1 sends uplink information by using the first resource, time at which the uplink information sent by the UE1 reaches the network device may be earlier than time at which uplink information sent, in a next timeslot, by UE2 that is in a synchronization state reaches the network device, provided that an uplink synchronization offset of the UE1 does not exceed time of two symbols. Therefore, uplink transmission reliability of the UE1 is improved while an uplink transmission latency of the UE1 is reduced.

In this application, the uplink out-of-synchronization state may be a state in which a time synchronization timer of the UE expires, and the uplink synchronization state may be a state in which the time synchronization timer of the UE is running. For example, the network device configures a parameter of a synchronization timer for the UE, and the UE uses the parameter of the synchronization timer to determine whether the UE is in the uplink out-of-synchronization state or the uplink synchronization state. When the UE receives a TAC, the UE starts or restarts the synchronization timer. If the synchronization timer expires, it is considered that the uplink is out of synchronization, and when the synchronization timer is in a running state, it is considered that the uplink of the UE is in synchronization. In this application, a method used by the UE to determine whether the UE is in the uplink out-of-synchronization state or the uplink synchronization state is not limited.

For example, the UE may further compare a difference between first time and second time. The first time is actual time at which the UE currently receives a downlink radio frame (which is assumed to be a radio frame i), and the second time is prediction time at which the UE currently receives the downlink radio frame (that is, the radio frame i) and that is determined by the UE based on a most recently received TAC and time of receiving a downlink radio frame (which is assumed to be a radio frame i−1) last time. If an absolute value of the difference between the first time and the second time is greater than a first time threshold, the UE determines that the UE is in the uplink out-of-synchronization state. If the absolute value of the difference between the first time and the second time is less than or equal to the first time threshold, the UE determines that the UE is in the uplink synchronization state. The first time threshold is a preset value.

Optionally, the first uplink information in the method 400 includes scheduling-free uplink information.

In a scheduling-free scenario, the UE usually has relatively emergent data (for example, URLLC service data) that needs to be transmitted. Therefore, the UE may send the emergent data before converting the uplink state from out-of-synchronization into synchronization. According to the uplink information sending method provided in this application, the UE sends, in the uplink out-of-synchronization state, uplink information by using a resource with a relatively short time length, so that an uplink transmission latency can be reduced while transmission reliability is not compromised.

Optionally, before the UE sends the first uplink information to the network device by using the first resource, the method 400 further includes:

determining, by the UE, a start point of a time domain resource of the first resource based on time of receiving downlink information.

For example, when the UE sends the uplink information by using the first resource, the UE is in the uplink out-of-synchronization state, and a previously received TAC is invalid. The UE may determine a time location of the radio frame i based on a time location of the radio frame i−1, to determine that a start moment of the radio frame i is $T_0$, and send the uplink information by using the first resource based on $T_0$. The time domain resource of the first resource may be a part of time resources of the radio frame i.

Optionally, before the UE determines to use the first resource, the method 400 further includes:

S401. The UE receives second configuration information from the network device, where the second configuration information is used to configure the first resource.

The network device may indicate, by using the second configuration information, a size of the time domain resource included in the first resource.

For example, in a communication scenario with a relatively low transmission reliability requirement, the network device may configure the first resource as a resource corresponding to first six symbols of one timeslot, or configure the first resource as a resource corresponding to first five symbols of one timeslot, and so on, to improve resource utilization while meeting the transmission reliability requirement.

For another example, the second configuration information is used to configure the first resource and the second resource. In a communication scenario with a relatively high transmission reliability requirement, the network device may configure the first resource as a resource that includes four symbols, and configure the second resource as a resource that includes seven symbols. There is a spacing of three symbols between the first resource and the second resource, so that an uplink transmission latency can be reduced while the transmission reliability requirement is met.

FIG. 6 is a flowchart of an uplink information receiving method according to embodiments of this application. The method 600 includes the following steps:

S610. A network device determines a first timing advance of UE, where the first timing advance is equal to a product of a timing advance coefficient and a first time length, the first time length is one of at least two different time lengths that are supported by the UE and that are used to determine a timing advance, and the first timing advance is used by the UE to send uplink information.

S620. The network device receives the uplink information from the UE.

In S610, the network device first determines the first time length from the at least two different time lengths supported by the UE, and then determines the first timing advance based on the first time length and the timing advance coefficient.

For example, in an LTE system, a timing advance is $T_{TA}$, a timing advance coefficient is $(N_{TA}+N_{TA\ offset})$, and $T_{TA}=(N_{TA}+N_{TA\ offset})\times T_S$, where $N_{TA}=T_A\times 16$, and $T_A$ is corresponding to a TAC field of an RAR; or $N_{TA}=N_{TA\_old}+(T_A-31)\times 16$, and $T_A$ is corresponding to a TAC field of a TAC MAC CE. The network device sends $T_A$ to the UE, so that the UE determines the first timing advance.

In S620, the network device detects, at predetermined time, the uplink information sent by the UE based on the first timing advance.

A person skilled in the art may clearly understand that the network device and the UE in the method 600 may be equivalent to the network device and the UE in the method 300, and actions of the network device and the UE are corresponding to actions of the network device and the UE in the method 300. For brevity, details are not described herein again.

Therefore, according to the uplink information receiving method provided in this application, for example, in a scenario with a relatively high latency requirement, a shorter time length in the at least two different time lengths may be used to improve uplink synchronization precision, and in a scenario with a relatively low latency requirement, a longer time length in the at least two different time lengths may be used, so that compatibility with more devices is ensured while the latency requirement is met. The network device determines, based on the different time lengths supported by the UE, timing advances used by the UE in different scenarios, diversified requirements of a 5G mobile communication system for uplink synchronization is satisfied.

Optionally, before the network device receives the uplink information from the UE, the method 600 further includes:

S601. The network device sends first information to the UE, where the first information is used to indicate the first time length.

The first information in the method 600 may be equivalent to the first information in the method 300. Therefore, the network device can flexibly determine, based on an actual situation, a time length used by the UE to determine the first timing advance.

Optionally, before the network device receives the uplink information from the UE, the method 600 further includes the following step:

S602. The network device sends second information to the UE, where there is a correspondence between a resource occupied by the second information and the first time length.

The second information in the method 600 may be equivalent to the second information in the method 300. Therefore, the network device can flexibly determine, based on an actual situation, a time length used by the UE to determine the first timing advance.

Optionally, there is a correspondence between the first time length and a service type of the uplink information and/or a resource type corresponding to the uplink information, and before the network device receives the uplink information from the UE, the method 600 further includes the following step:

S603. The network device determines the first time length based on the correspondence between the first time length and the service type of the uplink information, and/or the network device determines the first time length based on the correspondence between the first time length and the resource type corresponding to the uplink information.

Therefore, the network device can flexibly determine, based on an actual situation, a time length used by the UE to determine the first timing advance.

Optionally, the method 600 further includes the following step:

S630. The network device sends third information to the UE, where the third information is used to indicate at least one of the service type of the uplink information and the resource type corresponding to the uplink information.

The network device may pre-configure a resource for the uplink information to be sent by the UE, and the third information is used to indicate the configured resource. Alternatively, the network device may indicate, by using the third information, the service type of the uplink information to be sent by the UE, so that the network device can flexibly determine, based on an actual situation, the time length used by the UE to determine the first timing advance.

Optionally, the resource type includes at least one of the following parameters: a subcarrier spacing type, a cyclic prefix length, a symbol length, a timeslot length, a working frequency, and a subframe type.

Optionally, the service type includes at least one of the following parameters: quality of service, a target bit error rate, and a target block error rate.

Optionally, the method 600 further includes:

S640. The network device sends first configuration information to the UE, where the first configuration information is used to configure the at least two different time lengths used to determine a timing advance.

The network device may configure, for the UE, a time length that meets a requirement of a current communication environment, so that the UE can flexibly determine a timing advance. For example, the UE supports four time lengths used to determine a timing advance. When the current UE is in a URLLC communication environment, the network device may configure two shorter time lengths in the four time lengths for the UE by using configuration information. In this way, the UE can more precisely determine a timing advance, so that time at which the uplink information reaches the network device is more precise, uplink information transmission reliability is improved, and an uplink information transmission latency is reduced.

Figures 7, 8:
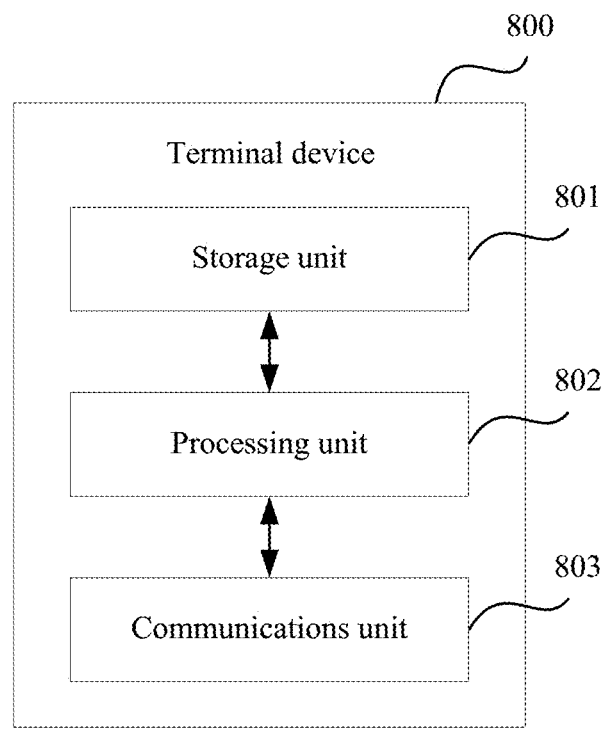
FIG. 7 is a flowchart of an uplink information receiving method according to another embodiment of this application.
FIG. 8 is a block diagram of a terminal device according to an embodiment of this application.

FIG. 7 is a flowchart of an uplink information receiving method according to another embodiment of this application. The method 700 includes the following steps:

S710. A network device determines a first resource, where a time length of the first resource is less than a time length of a second resource, the first resource is used by UE to send first uplink information in an uplink out-of-synchronization state, the first uplink information includes information other than a random access preamble sequence, and the second resource is used by UE to send second uplink information in an uplink synchronization state.

S720. The network device sends second configuration information to the UE, where the second configuration information is used to configure the first resource.

The network device may indicate, by using the second configuration information, a size of a time domain resource included in the first resource. When the terminal device is in the uplink out-of-synchronization state, the terminal device determines to use the first resource, and sends the first uplink information to the network device by using the first resource. The first uplink information includes the information other than the random access preamble sequence. For example, the first uplink information may be at least one of service data, feedback information, and request information. Therefore, the network device may receive the information other than the random access preamble sequence without a need to wait for uplink synchronization performed by the terminal device, so that an uplink information transmission latency is reduced, and resource utilization is improved.

The network device and the UE in the method 700 may be equivalent to the network device and the UE in the method 400, and actions of the network device and the UE are corresponding to actions of the network device and the UE in the method 400. For brevity, details are not described herein again.

Optionally, the method 700 further includes:

S730. The network device receives the first uplink information from the UE by using the first resource, where the first uplink information includes scheduling-free uplink information.

In a scheduling-free scenario, the UE usually has relatively emergent data (for example, URLLC data) that needs to be transmitted. Therefore, the UE may send the emergent data before converting the uplink state from out-of-synchronization into synchronization. According to the uplink information receiving method provided in this application, the UE sends, in the uplink out-of-synchronization state, uplink information by using a resource with a relatively short time length, so that an uplink transmission latency can be reduced while transmission reliability is not compromised.

Optionally, there is a spacing of at least one time unit between the first resource and the second resource on time domain.

According to the method provided in this embodiment, when the terminal device is in the uplink out-of-synchronization state, and when time at which the first uplink information reaches the network device is relatively late, because there is the spacing of at least one time unit between the first resource and the second resource, a possibility that uplink information transmitted by using the first resource and uplink information transmitted by using the second resource affect each other is greatly reduced, so that uplink transmission reliability is improved.

Optionally, the uplink out-of-synchronization state is a state in which a time synchronization timer of the UE expires, and the uplink synchronization state is a state in which the time synchronization timer of the UE is running.

In this application, the uplink out-of-synchronization state may be a state in which a time synchronization timer of the UE expires, and the uplink synchronization state may be a state in which the time synchronization timer of the UE is running. In this application, a method used by the UE to determine whether the UE is in the uplink out-of-synchronization state or the uplink synchronization state is not limited.

The foregoing describes in detail examples of the uplink information sending method and the uplink information receiving method according to this application. It may be understood that, to implement the foregoing functions, the terminal device and the network device include corresponding hardware structures and/or software modules for performing the functions. Units and algorithm steps in the examples described with reference to the embodiments disclosed in this specification may be implemented in a form of hardware or in a form of a combination of hardware and computer software in this application. Whether a function is performed by hardware or computer software driving hardware depends on particular applications and design constraint conditions of the technical solutions. Different methods may be used to implement the described functions for each particular application, but it should not be considered that the implementation goes beyond the scope of this application.

In this application, the terminal device and the like may be divided into functional units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that the unit division in this application is an example, and is merely logical function division and may be performed in another division manner in actual implementation.

When an integrated unit is used, FIG. 8 is a block diagram of a terminal device in the foregoing embodiments. A terminal device 800 includes a processing unit 802 and a communication unit 803. The processing unit 802 is configured to control and manage an action of the terminal device 800. For example, the processing unit 802 is configured to support the terminal device 800 in performing above methods 300 and 400, and may be configured to perform another process of the technology described in this specification. The communication unit 803 is configured to support communication between the terminal device 800 and another network entity, for example, communication between the terminal device 800 and a network device. The terminal device 800 may further include a storage unit 801, configured to store program code and data of the terminal device 800.

The processing unit 802 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 802 may implement or execute various examples of logical blocks, modules, and circuits that are described with reference to content disclosed in this application. Alternatively, the processor may be a combination for implementing a computing function, such as a combination including one or more microprocessors or a combination of a DSP and a microprocessor. The communication unit 803 may be a transceiver, a transceiver circuit, or the like. The storage unit 801 may be a memory.

Figure 9:
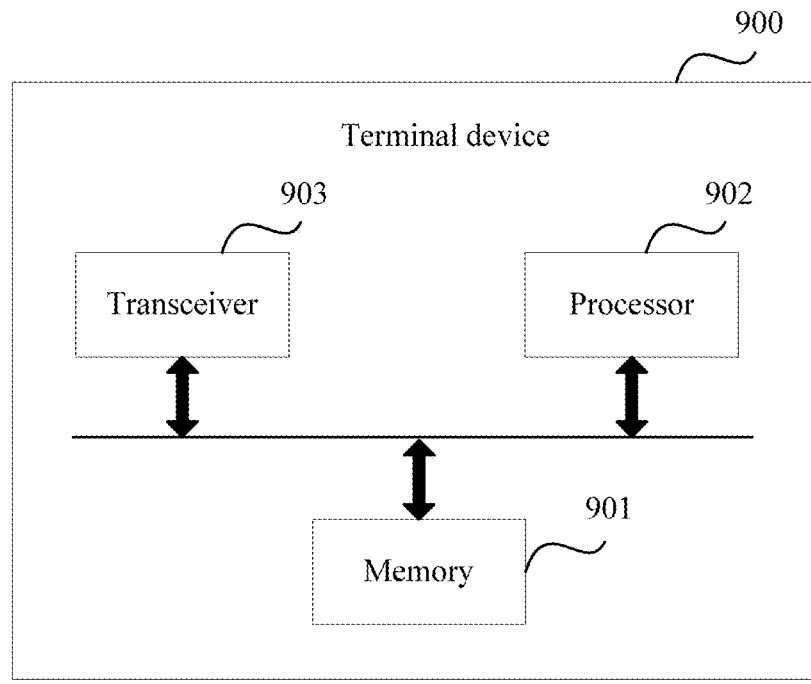
FIG. 9 is a block diagram of a terminal device according to another embodiment of this application.

When the processing unit 802 is a processor, the communication unit 803 is a transceiver, and the storage unit 801 is a memory, the terminal device in this application may be a terminal device shown in FIG. 9.

As shown in FIG. 9, terminal device 900 includes a processor 902, a transceiver 903, and a memory 901. The transceiver 903, the processor 902, and the memory 901 may communicate with each other and transmit a control signal and/or a data signal by using an internal connection path.

In brief and convenient description, for a specific working process of the foregoing described apparatuses and units, refer to a corresponding process in the foregoing method embodiments. Details are not described herein.

The terminal device 800 and the terminal device 900 provided in this application use different timing advances in different scenarios, and diversified requirements of a 5G mobile communication system for uplink synchronization is satisfied.

Figure 10:
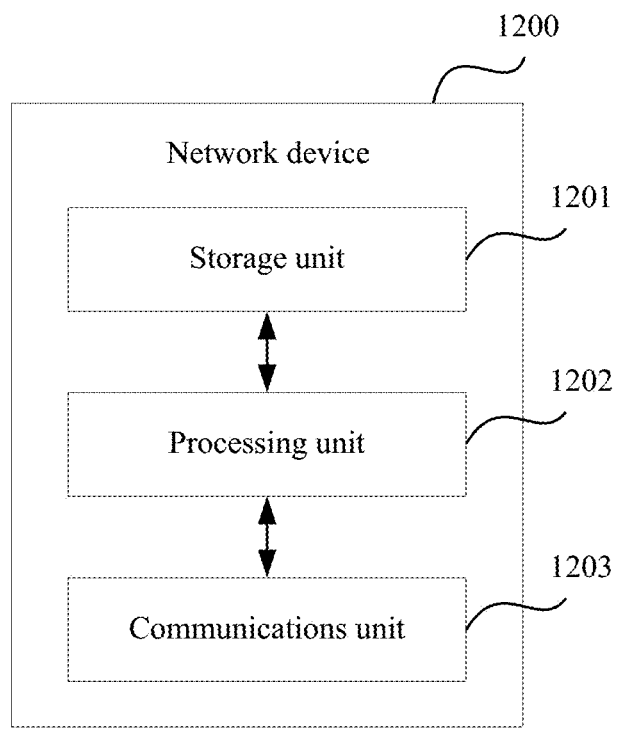
FIG. 10 is a block diagram of a network device according to an embodiment of this application.

When an integrated unit is used, FIG. 10 is a possible schematic structural diagram of a network device in the foregoing embodiments. A network device 1200 includes a processing unit 1202 and a communication unit 1203. The processing unit 1202 is configured to control and manage an action of the network device 1200. For example, the processing unit 1202 is configured to support the network device 1200 in performing above methods 600 and 700, and may be configured to perform another process of the technology described in this specification. The communication unit 1203 is configured to support communication between the network device 1200 and another network entity, for example, communication between the network device 1200 and a terminal device. The network device 1200 may further include a storage unit 1201, configured to store program code and data of the network device 1200.

The processing unit 1202 may be a processor or a controller, for example, may be a CPU, a general-purpose processor, a DSP, an ASIC, an FPGA, or another programmable logic device, a transistor logic device, a hardware component, or any combination thereof. The processing unit 1202 may implement or execute various examples of logical blocks, modules, and circuits that are described with reference to content disclosed in this application. Alternatively, the processor may be a combination for implementing a computing function, such as a combination including one or more microprocessors or a combination of a DSP and a microprocessor. The communication unit 1203 may be a transceiver, a transceiver circuit, or the like. The storage unit 1201 may be a memory.

When the processing unit 1202 is a processor, the communication unit 1203 is a transceiver, and the storage unit 1201 is a memory, the network device in this application may be a network device shown in FIG. 13.

Figure 11:
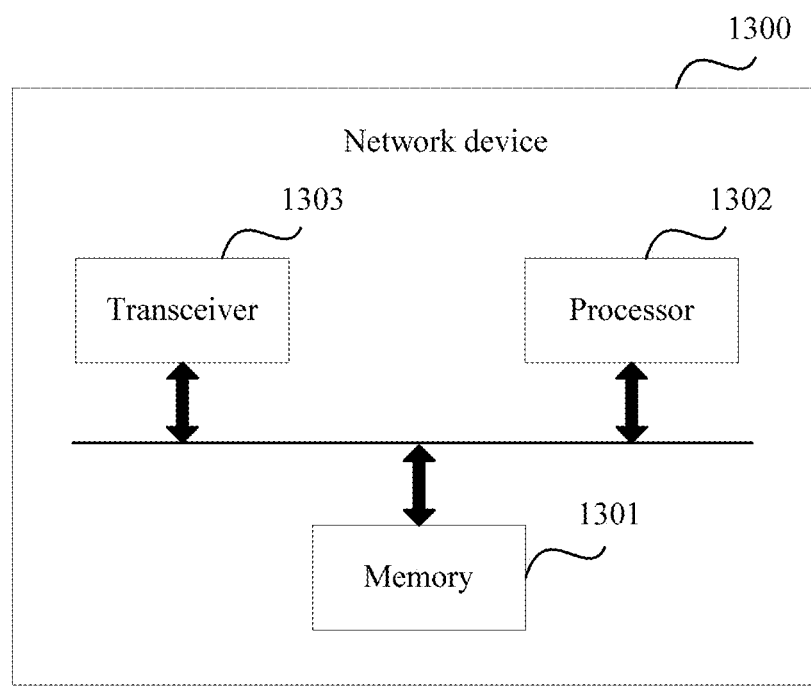
FIG. 11 is a block diagram of a network device according to another embodiment of this application.

As shown in FIG. 11, network device 1300 includes a processor 1302, a transceiver 1303, and a memory 1301. The transceiver 1303, the processor 1302, and the memory 1301 may communicate with each other and transmit a control signal and/or a data signal by using an internal connection path.

A person skilled in the art may clearly understand that, for brief and convenient description, for a specific working process of the foregoing described apparatuses and units, refer to a corresponding process in the foregoing method embodiments. Details are not described herein.

The network device 1200 and the network device 1300 provided in this application determine, based on different time lengths supported by the terminal device, timing advances used by the terminal device in different scenarios. For example, in a scenario with a relatively high latency requirement, a shorter time length in at least two different time lengths may be used to improve uplink synchronization precision, and in a scenario with a relatively low latency requirement, a longer time length in the at least two different time lengths may be used, so that compatibility with more devices is ensured while the latency requirement is met, and diversified requirements of a 5G mobile communication system for uplink synchronization is satisfied.

It should be understood that a transceiver may include a transmitter and a receiver. The transceiver may further include an antenna, and there may be one or more antennas. A memory may be a separate component, or may be integrated into a processor. The foregoing components or some components may be integrated into a chip for implementation, for example, integrated into a baseband chip for implementation.

Network devices or terminal devices in the apparatus embodiments are totally corresponding to those in the method embodiments, and corresponding modules perform corresponding steps. For example, a sending module or a transmitter performs a sending step in the method embodiments, a receiving module or a receiver performs a receiving step received in the method embodiments, and steps other than the sending and receiving steps may be performed by a processing module or a processor. For a function of a specific module, refer to a corresponding method embodiment. Details are not described again.

An embodiment of this application further provides a communication chip. The communication chip stores an instruction, and when the instruction is run on the terminal device 800 or the terminal device 900, the communication chip performs the method corresponding to the terminal device in the foregoing various implementations.

An embodiment of this application further provides a communication chip. The communication chip stores an instruction, and when the instruction is run on the network device 1200 or the network device 1300, the communication chip performs the method corresponding to the network device in the foregoing various implementations.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a terminal device. Certainly, the processor and the storage medium may exist in a terminal device or a network device as discrete components.

All or some of the foregoing embodiments may be implemented by using software, hardware, firmware, or any combination thereof. When the embodiments are implemented by using software, the embodiments may be implemented totally or partially in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instruction may be stored in a computer readable storage medium, or may be transmitted by using the computer readable storage medium. The computer instruction may be transmitted from a website station, a computer, a server or a data center to another website station, another computer, another server, or another data center in a wired (for example, a coaxial cable, a fiber, or a digital subscriber line (DSL)) or wireless (for example, infrared, radio, or a microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made within the spirit and principle of this application shall fall within the protection scope of this application.

What is claimed is:

1. A method for sending uplink information in a wireless communication system that includes a terminal device and a network device, comprising:
   receiving, by the terminal device, a timing advance coefficient from a network device;
   determining, by the terminal device, value of a first timing advance based on a first time length and the timing advance coefficient, wherein the first time length is one of at least two different time lengths supported by the terminal device, and the first time length is determined based on whether or not a timeslot is all uplink or a mixture of uplink and downlink; and
   sending, by the terminal device, the uplink information to the network device based on the first timing advance.

2. The method according to claim 1, wherein receiving the timing advance coefficient comprises:
   receiving the timing advance coefficient carried in a random access response (RAR) or a timing advance command media access control control element (TAC MAC CE).

3. A terminal device in a wireless communication system, comprising:
a processor and a memory unit coupled to the processor for storing program instructions; wherein the program instructions, when executed by the processor, cause the terminal device to:
receive a timing advance coefficient from a network device;
determine value of a first timing advance based on a first time length and the timing advance coefficient, wherein the first time length is one of at least two different time lengths that are supported by the terminal device, and the first time length is determined based on whether or not a timeslot is all uplink or a mixture of uplink and downlink; and
send uplink information to the network device based on the first timing advance.

4. The terminal device according to claim 3, wherein in receiving the timing advance coefficient, the program instructions cause the terminal device to:
receive the timing advance coefficient carried in a random access response (RAR) or a timing advance command media access control control element (TAC MAC CE).

5. A non-transitory computer-readable medium storing program codes for use by a processor of a terminal device, wherein the program codes comprise instructions for:
receiving a timing advance coefficient from a network device;
determining value of a first timing advance based on a first time length and the timing advance coefficient, wherein the first time length is one of at least two different time lengths that are supported by the terminal device, and the first time length is determined based on whether or not a timeslot is all uplink or a mixture of uplink and downlink; and
send uplink information to the network device based on the first timing advance.

6. The non-transitory computer-readable medium according to claim 5, wherein receiving the timing advance coefficient comprises:
receiving the timing advance coefficient carried in a random access response (RAR) or a timing advance command media access control control element (TAC MAC CE).

* * * * *